Dec. 29, 1925.
H. McMANUS ET AL
1,568,023
PICTURE SCREEN
Filed April 18, 1922
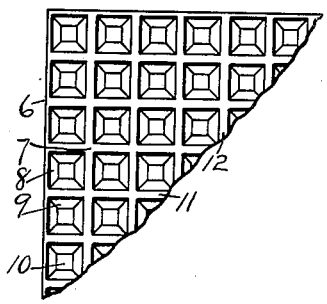
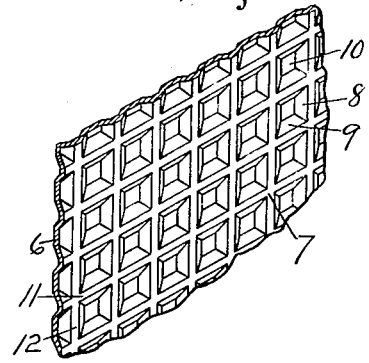
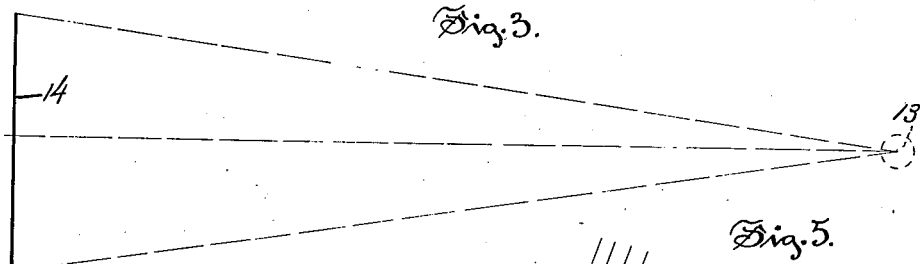
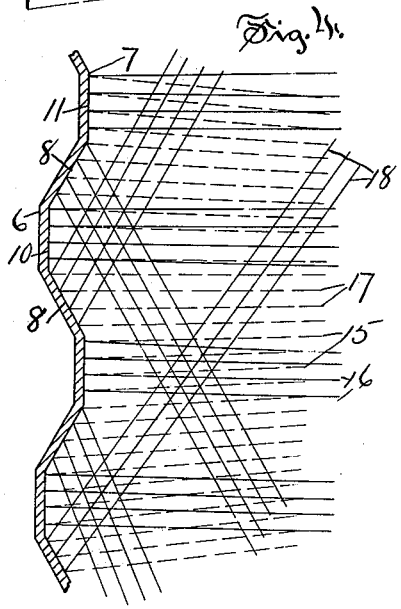
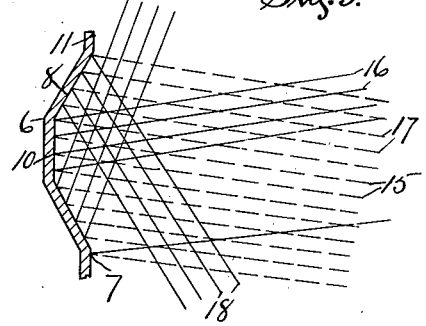
Inventor
Henry McManus,
Cortlandt F. Luce,
By Arthur B. Jenkins,
Attorney Patented Dec. 29, 1925.

1,568,023

UNITED STATES PATENT OFFICE.

HENRY McMANUS, OF HARTFORD, AND CORTLANDT F. LUCE, OF WEST HARTFORD, CONNECTICUT, ASSIGNORS TO THE EUREKA-CINEMA CORPORATION, OF HARTFORD, CONNECTICUT, A CORPORATION OF DELAWARE.

PICTURE SCREEN.

Application filed April 18, 1922. Serial No. 555,022.

*To all whom it may concern:*

Be it known that we, HENRY McMANUS and CORTLANDT F. LUCE, each a citizen of the United States, and residents, respectively, of Hartford and West Hartford, both in the county of Hartford and State of Connecticut, have invented new and Improved Picture Screens, of which the following is a specification.

Our invention relates to the class of devices upon which pictures, more commonly of the moving picture type, are displayed, and an object of our invention, among others, is to provide a screen upon which pictures shall be displayed with uniformity as to appearance as to all parts of the screen and from whatever direction viewed, and especially one in which the effects upon the eyes of the observer shall be pleasing.

One form of screen embodying our invention and in the construction and use of which the objects herein set out, as well as others, may be attained, is illustrated in the accompanying drawings, in which—

Figure 1 is a view of a portion of a picture screen embodying our invention.

Figure 2 is a view of a portion of said screen looking at it in an oblique direction.

Figure 3 is a diagrammatic view illustrating the relative positions as to the screen and the source of light.

Figure 4 is a diagrammatic view, scale enlarged, illustrating the reflection of the rays of light from a certain portion of the screen, the latter being shown in horizontal section.

Figure 5 is a view similar to Figure 4 but reflecting the light rays from a portion of the screen different from that shown in Figure 4.

Picture screens, more especially for the production of moving pictures, as heretofore constructed, have been more or less defective in many respects, causing eye strain and consequent unappreciativeness on the part of the observer, and while attempts to cure these defects have proved more or less successful in some respects, but have not produced efficient results in other respects, a special effort has been put forth in the production of the screen herein illustrated and described to obtain a surface having the essential qualities, among others, of substantially perfect diffusion, uniform illumination, equal distribution, absence of glare, freedom from strain, elimination of distortion, strong contrasts, soft detail, true color values, and stereoscopic effects.

In effecting our purpose a motion picture display screen has been produced having an embossed surface, the base or fabric of which has flexible characteristics possessing elastic qualities of such nature that when the fabric is stretched on a frame and greater or less degree of tension applied, such fabric will change the reflective character of the surface in such a way that light rays projected on it will be reflected uniformly and definitely in equal proportions in all directions, and the tension can, therefore, be so adjusted as to meet the conditions of illumination required while maintaining the proportional ratio of distribution. Our improved screen as illustrated and described herein comprises a base 6 constructed of any suitable material and in any suitable manner, and this may be knitted, woven, or other structure, or it may be of other material, the elements of which may be secured together in any suitable manner so long as it possesses the qualities of flexibility and elasticity. The face 7 of this screen is practically smooth, so far as the sense of touch is concerned, and it is light in color, preferably white.

In order to cause the light rays projected against this face from a suitable instrument to be diffused and equally distributed to provide a uniform illumination, such face is of an undulatory character both vertically and horizontally, and while these undulations may assume different forms that illustrated and described herein has been found to produce most beneficial results, in which the depressions are formed preferably square as viewed from the front and having sloping sides 8 and sloping ends 9, the bottoms 10 of the depressions being all of substantially the same distance from the face and all in a plane parallel with the face of the screen. The flat face of the screen is thus divided into cross bars 11 and vertical bars 12, and it is intended that the sloping surfaces shall be such in area as compared with the flat surfaces 10—11—12 that the same number of rays of light, if projected on to the screen perpendicularly to the flat surfaces, would strike the sloping surfaces as would strike the flat surfaces.

In utilizing this arrangement the rays of light projected from a source 13 toward the screen, represented generally by 14, will be influenced, as illustrated in Figures 4 and 5, in which the direct rays 15 projected against the flat surfaces will be reflected in the directions as indicated by 16, while the rays 17 projected against the sloping surfaces 8 will be reflected in directions indicated by the full lines 18, and it will be noted, as illustrated in Figure 5, in which a portion of the screen more distant from the center than that illustrated in Figure 4 is shown, that all of the reflected rays 18 are projected at angles more nearly parallel with the face of the screen than are the rays nearer the center of the screen, and as illustrated in Figure 4.

From this it will be seen that not only the projected rays cross other projected rays at angles to them, but they will cross the reflected rays at angles thereto, and the reflected rays also cross each other and the projected rays, this being true as to rays projected and reflected both as to the flat and sloping surfaces. In this way the rays of light are completely broken up and the intensity common to uninterrupted reflected rays is greatly reduced with the result that instead of well defined rays or pencils of light being reflected from the screen a mass of diffused light is reflected. Furthermore projected rays striking the sloping surfaces are directed laterally to a greater degree than are the projected rays striking the flat surfaces with a result that the screen is illuminated at the borders substantially as brightly as at the center, and the intensity of the light being destroyed a softer effect upon the eyes is produced tending to eliminate eye strain and fatigue.

The size of the depressions is immaterial to our invention so long as the relative proportions of the sloping and flat surfaces are observed. The depressions are considerably exaggerated as illustrated in the drawing, this to clearly bring out the invention, it being stated that a screen having a surface with depressions an eighth of an inch across will produce satisfactory results, and, as above stated, these dimensions may be departed from in either direction.

In accordance with the provisions of the patent statutes we have described the principles of operation of our invention, together with the device which we consider to represent the best embodiment thereof; but we desire to have it understood that the device shown is only illustrative and that the invention may be carried out by other means.

We claim—

1. A picture screen having a flat surface and sloping surfaces of proportional areas to each absorb substantially the same number of rays of light projected upon the screen perpendicularly to the flat surface thereof.

2. A picture screen having flat surfaces arranged in different planes and also sloping surfaces, the areas of the combined flat surfaces and those of the combined sloping surfaces being proportioned to each absorb the same number of rays of light projected on the screen perpendicularly to the flat surfaces thereof.

3. A picture screen having depressions of substantially uniform shape and size evenly distributed over its entire effective area and comprising flat surfaces and sloping surfaces, the combined areas of the flat surfaces and those of the sloping surfaces being arranged to absorb substantially the same number of rays of light projected upon the screen perpendicularly to the flat surface thereof.

4. A picture screen comprising depressions of truncated pyramidal shape distributed uniformly over its entire effective surface and divided by flat surfaces, the combined area of the flat surfaces of the borders and bottoms of the depressions being proportioned to the areas of the sloping sides to each absorb substantially the same number of rays of light projected on the screen perpendicularly to the flat surfaces thereof.

5. A picture screen comprising a base having elastic qualities and comprising a surface composed of depressions evenly distributed over the effective area of such surface and having sloping walls, and flat surfaces bordering such depressions, the area of the flat surfaces being proportioned to the area of the sloping surfaces to receive substantially the same number of rays projected upon the screen perpendicularly to the flat surfaces thereof.

6. A picture screen comprising a flexible base having elastic qualities and comprising a surface composed of depressions evenly distributed over the effective area of such surface and having sloping walls, and flat surfaces bordering such depressions, the area of the flat surfaces being proportioned to the area of the sloping surfaces to receive substantially the same number of rays projected upon the screen perpendicularly to the flat surfaces thereof.

7. A picture screen comprising a flexible base having elastic qualities and comprising a surface composed of depressions of truncated pyramidal shape evenly distributed over the effective working surface of the screen and bordered by flat surfaces, the combined area of the flat surfaces of the borders and bottoms of the depressions being proportioned to the areas of the sloping sides thereof to absorb substantially the same number of rays projected upon the screen perpendicularly to the flat surfaces thereof.

8. A picture screen having a surface composed of undulations extending across the screen at angles to each other and of substantially equal width with flat crowns and flat bottoms joined by flat sloping surfaces, the structure creating figures all of the same shape disposed evenly over the entire surface of the screen.

HENRY McMANUS.
CORTLANDT F. LUCE.